(12) United States Patent
He et al.

(10) Patent No.: US 12,250,723 B2
(45) Date of Patent: Mar. 11, 2025

(54) METHOD AND APPARATUS FOR CHANNEL OCCUPANCY TIME SHARING IN WIRELESS COMMUNICATION

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Jie Cui, San Jose, CA (US); Oghenekome Oteri, San Diego, CA (US); Wei Zeng, Saratoga, CA (US); Wei Zhang, Santa Clara, CA (US); Weidong Yang, San Diego, CA (US); Yang Tang, San Jose, CA (US); Yuchul Kim, San Jose, CA (US); Yushu Zhang, Beijing (CN); Zhibin Wu, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/441,362

(22) PCT Filed: May 14, 2020

(86) PCT No.: PCT/CN2020/090161
§ 371 (c)(1),
(2) Date: Sep. 21, 2021

(87) PCT Pub. No.: WO2021/226909
PCT Pub. Date: Nov. 18, 2021

(65) Prior Publication Data
US 2023/0095487 A1    Mar. 30, 2023

(51) Int. Cl.
*H04W 74/0816*    (2024.01)
*H04W 72/12*    (2023.01)
(Continued)

(52) U.S. Cl.
CPC ....... *H04W 74/0816* (2013.01); *H04W 72/12* (2013.01); *H04W 72/21* (2023.01); *H04W 74/0866* (2013.01)

(58) Field of Classification Search
CPC ......... H04W 74/0816; H04W 74/0866; H04W 72/21; H04W 72/12
(Continued)

(56) References Cited

U.S. PATENT DOCUMENTS

| 2019/0342911 A1 | 11/2019 | Talarico et al. |
| 2021/0212120 A1 | 7/2021 | Jiang et al. |

(Continued)

FOREIGN PATENT DOCUMENTS

| CN | 109417792 A | 3/2019 |
| CN | 110932829 A | 3/2020 |

(Continued)

OTHER PUBLICATIONS

R1-2002684, "COT sharing information in CG-UCI",3GPP TSG RAN WG1 #100bis, E-meeting, Apr. 20-30, 2020, source Lenovo, Motorola Mobility (Year: 2020).*
(Continued)

*Primary Examiner* — Intekhaab A Siddiquee
(74) *Attorney, Agent, or Firm* — Sterne, Kessler, Goldstein & Fox P.L.L.C.

(57) ABSTRACT

Methods and apparatuses are disclosed for signaling unused channel occupancy time (COT) to the gNB for COT sharing among other UEs. Upon determining that a portion of the maximum COT (MCOT) provided to the UE will be unused, the UE can generate COT sharing information for transmission back to the gNB. The COT sharing information identifies a starting point and a duration (e.g., a number of consecutive slots) of the unused portion of the MCOT. This information is then encoded into configured grant uplink
(Continued)

control information (UG-UCI) and transmitted to the gNB as part of the uplink transmission. In aspects, the unused portion may begin part-way through a slot. In this instance, a starting symbol of the unused portion or an ending symbol of the used portion may also be encoded into the uplink transmission. In this manner, unused COT is not wasted, but rather repurposed by the gNB.

20 Claims, 13 Drawing Sheets

(51) Int. Cl.
  *H04W 72/21* (2023.01)
  *H04W 74/08* (2024.01)
(58) Field of Classification Search
  USPC .......................................................... 370/329
  See application file for complete search history.

(56) References Cited

U.S. PATENT DOCUMENTS

| 2021/0344451 | A1 | 11/2021 | Hedayat et al. |
| 2023/0291527 | A1 | 9/2023 | Myung et al. |

FOREIGN PATENT DOCUMENTS

| GB | 2550200 A | 11/2017 |
| TW | 202015447 A | 4/2020 |
| WO | WO 2020/033689 A1 | 2/2020 |
| WO | WO 2020032699 A1 | 2/2020 |

OTHER PUBLICATIONS

RI-1910048, "Transmission with configured grant in NR unlicensed band", 3GPP TSG RAN WG1 Meeting #98bis Chongqing, China, Oct. 14-20, 2019, source Huawei, HiSilicon (Year: 2019).*
RI-1905792, "Outcome of offline discussion on Configured grant enhancement",3GPP TSG RAN WG1#96bis Xi'an, China, Apr. 8-12, 2019, source vivo (Year: 2019).*
Extended European Search Report directed to related European Application No. 20936031.2, mailed on Oct. 17, 2023, 11 pages.
Huawei, Hisilicon, "Transmission with configured grant in NR unlicensed band," 3GPP TSG RAN WG1 Meeting #98bis; R1-1910048, Chongqing, China, Oct. 14-20, 2019, 22 pages.
Vivo, "Outcome of offline discussion on Configured grant enhancement," 3GPP TSG RAN WG1 #96bis; R1-1905792, Xi'an, China, Apr. 8-12, 2019, 27 pages.
Sony, "Channel access for NR unlicensed operations," 3GPP TSG RAN WG1 #98bis, R1-1910759, 3GPP TSG RAN WG1 #98bis, Chongqing, China, Oct. 14-20, 2019, 4 pages.
Ericsson, "On Channel Access for AUL," 3GPP TSG RAN WG1 Meeting #90, R1-1713312, Prague, Czech Republic, Aug. 21-25, 2017, 3 pages.
International Search Report and Written Opinion of the International Searching Authority directed to related International Patent Application No. PCT/CN2020/090161, mailed Feb. 18, 2021; 8 pages.
3GPP, "COT sharing information in CG-UCI," R1-2002684, Apr. 30, 2020, accessed at https://www.3gpp.org/ftp/TSG_RAN/WG1_RL1/TSGR1_100b_e/Docs/?sortby=daterev.
Office Action and Search Report directed to related Chinese Application No. 202080100741.0, with translation of the Search Report attached, mailed Jan. 8, 2025; 11 pages.

* cited by examiner

METHOD AND APPARATUS FOR CHANNEL OCCUPANCY TIME SHARING IN WIRELESS COMMUNICATION

CROSS-REFERENCE TO RELATED APPLICATION

This application is a U.S. National Phase of International Application No. PCT/CN2020/090161, filed May 14, 2020, which is hereby incorporated by reference in its entirety.

FIELD

Various aspects generally may relate to the field of wireless communications.

SUMMARY

According to aspects of the present disclosure, a UE receives a maximum channel occupancy time (MCOT) from a serving base station. However, the UE determines that only a portion of the MCOT is needed, and thus a remainder portion will go unused. As a result, in the uplink transmission, the UE encodes COT sharing information, which can be decoded by the base station to determine the unused portion of the MCOT. This unused portion can then be reallocated to other UEs.

In aspects, a user equipment is described that includes a transceiver configured to transmit and receive information with a communications network and one or more processors. The one or more processors are configured to carry out a number of functions relating to COT sharing. Specifically, the one or more processors receive a maximum channel occupancy time (MCOT) from the communications network. Then, a first portion of the MCOT is determined that will be used for uplink transmission and a remainder portion of the MCOT is determined that will be unused. The processors then generate an uplink transmission for transmitting during the first portion of the MCOT that includes channel occupancy time (COT) sharing information, the COT sharing information describing at least one of a location or a duration of the remainder portion of the MCOT. Finally, the processors cause the transceiver to transmit the uplink transmission to the communications network.

In aspects, a user equipment is disclosed that includes a transceiver configured to transmit and receive information with a communications network and one or more processors. The one or more processors are configured to carry out a number of functions relating to COT sharing. Specifically, the one or more processors receive a maximum channel occupancy time (MCOT) from the communications network. Then, a first portion of the MCOT is determined that will be used for uplink transmission and a remainder portion of the MCOT is determined that will be unused. The remainder portion includes an unused portion of the ending slot. Thereafter, an uplink transmission is generated for transmitting during the first portion of the MCOT that includes channel occupancy time (COT) sharing information, the COT sharing information describing a starting point of the remainder portion of the MCOT based on the unused portion of the ending slot. Then the one or more processors cause the transceiver to transmit the uplink transmission to the communications network.

In an aspect, the COT sharing information is included within configured grant uplink control information (CG-UCI) of the uplink transmission.

In an aspect, the COT sharing information describes a starting slot and a number of consecutive slots of the remainder portion of the MCOT.

In an aspect, the COT sharing information includes an index value from which the starting slot and the number of consecutive slots can be determined.

In an aspect, the one or more processors is further configured to determine the number of consecutive slots based on a Channel Access Priority Class (CAPC) used by the user equipment to obtain the channel.

In an aspect, the one or more processors are further configured to derive the index value from the number of consecutive slots.

In an aspect, the one or more processors are further configured to receive a subcarrier spacing reference from the communications network, and generate a scaling factor based on the received subcarrier spacing reference.

In an aspect, the generating the uplink transmission includes a symbol indicator that describes a starting point of the MCOT within the ending slot.

In an aspect, the symbol indicator identifies an ending symbol within the ending slot of the first portion of the MCOT.

In an aspect, the symbol indicator is separately encoded in a dedicated information field of a configured grant uplink control information (CG-UCI).

In an aspect, the one or more processors are further configured to set the starting point of the remainder portion of the MCOT to an even symbol of the unused portion of the ending slot.

In an aspect, the one or more processors are further configured to set the starting point of the remainder portion of the MCOT to a nearest half-slot boundary after the first portion.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

DETAILED DESCRIPTION

In Release 16 of the 3GPP specification, New Radio (NR) based access to Unlicensed Spectrum (NR-U) supports autonomous uplink (AUL) transmission. This is particular important in NR-U to enhance the uplink transmission performance when it coexists with an unscheduled autonomous system, such as WiFi. Specifically, AUL avoids double listen-before-talk (LBT) requirements at both a gNB (e.g., a base station) and a user equipment (UE). Specifically, LBT is generally regarded as difficult to implement, but also the most likely to provide fair coexistence with Wi-Fi. This is because WiFi's LBT, called the Distributed Coordination Function (DCF), or Enhanced Distributed Channel Access (EDCA) depending on the Wi-Fi vintage, differs slightly from the LBT implemented in other wireless communication systems.

When NR-U acquires the channel by performing a Cat-4 LBT channel access procedure, the uplink (UL) transmission is allowed by regulation to be performed for up to a Maximum Channel Occupancy Time (MCOT) duration—8 ms, for example. If the UL transmission (e.g., the configured grant PUSCH) is shorter than the acquired MCOT, the leftover resources are unnecessarily lost. In order to better utilize the Channel Occupancy Time (COT), 3GPP was recently amended to allow UE sharing of the remaining resource in the acquired MCOT to the gNB for downlink (DL) and uplink transmissions. However, in its current form, the 3GPP specification does not provide a means for signaling the remaining UE-shared COT length to the gNB. The present disclosure provides a variety of solutions to this problem and other related issues.

Figure 1:
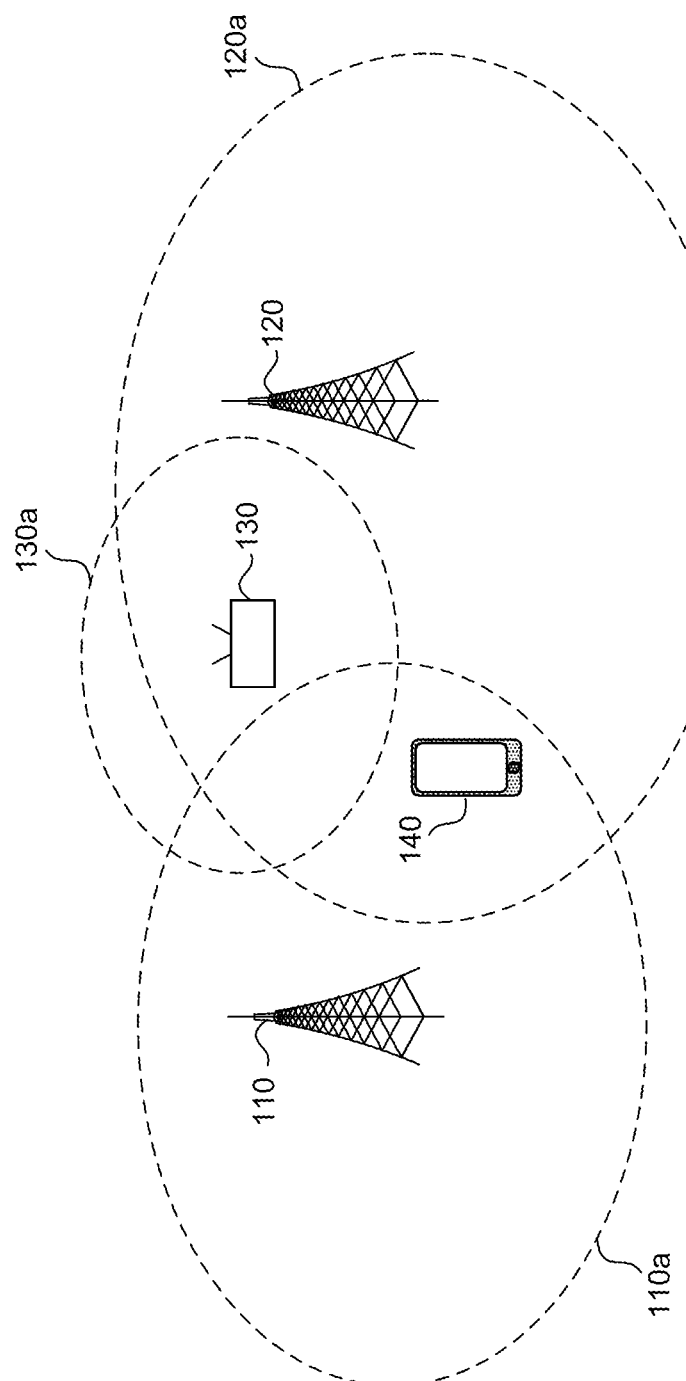
FIG. 1 illustrates an exemplary wireless communication environment according to an aspect.

FIG. 1 illustrates an exemplary wireless communication environment 100 according to an aspect. The environment 100 includes base stations 110 and 120, each having respective coverage areas 110a and 120a. In an aspect, the base stations 110 and 120 are gNodeBs (also referred herein as "gNBs"), eNodeBs, or another network-connected access point. The base stations 110 and 120 are connected to the network backend, and provide cellular connectivity to devices within their respective coverage areas.

An access point 130 may also be disposed in the environment 100, and include its own coverage area 130a. The access point can be any other type of transmission and reception point (TRP), such as a macro-cell, small cell, pico-cell, femto-cell, remote radio head, relay node, etc. Together, the base stations 110 and 120 and the access point 130 provide a network of cellular connectivity to UEs in environment 100. One such UE 140 is illustrated as being within the coverage area 110a of base station 110 and coverage area 120a of base station 120. In operation, a serving base station 110/120 and/or access point 130 will communicate with the UE 140 in order to configure shared channel occupancy time.

Figure 2:
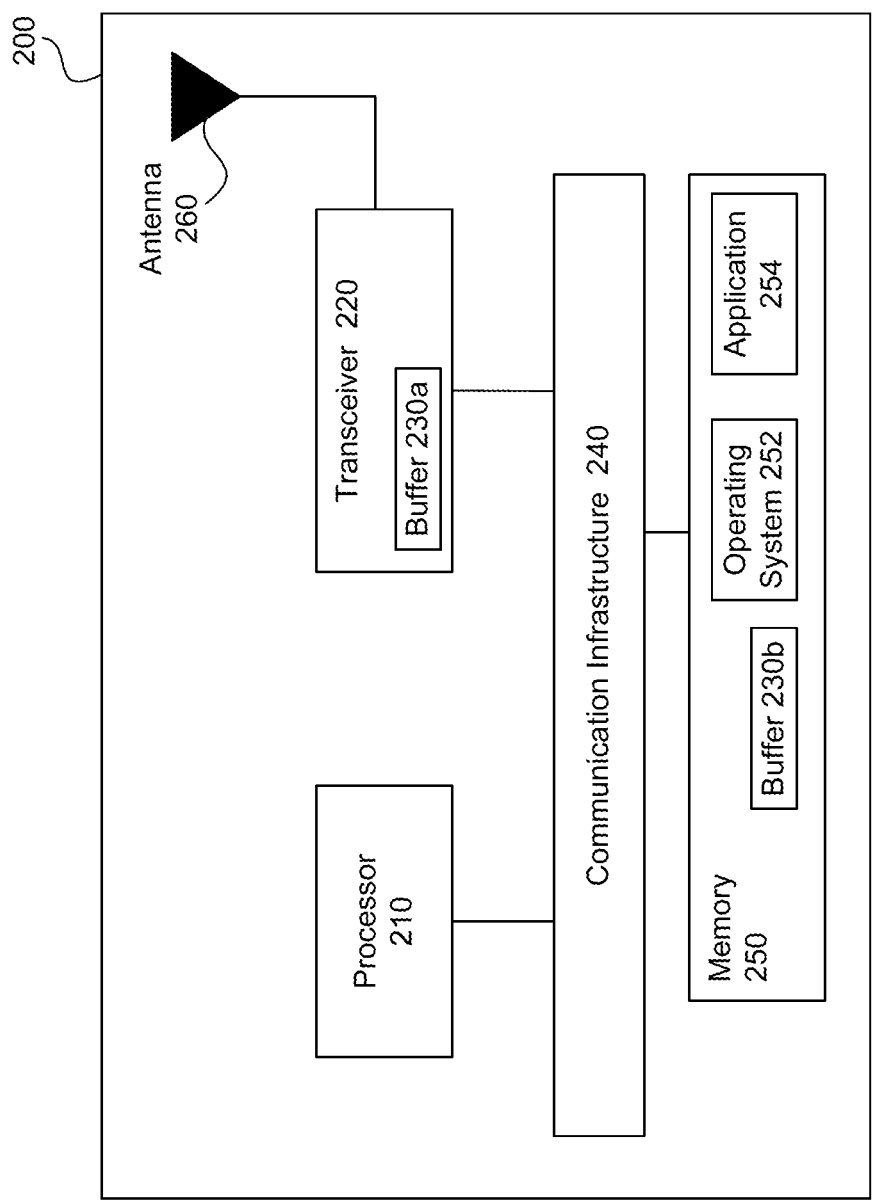
FIG. 2 illustrates a block diagram of an exemplary user equipment according to an aspect.

FIG. 2 illustrates a block diagram of an example wireless system 200 of an electronic device implementing the measurement signal collision resolution, according to some aspects of the disclosure. System 200 may be any of the electronic devices (e.g., AP 1010, STA 1020) of environment 100, including UE 140. System 200 includes processor 210, transceiver 220, buffer(s) 230a and 230b, communication infrastructure 240, memory 250, operating system 252, application 254, and antenna 260. Illustrated systems are provided as exemplary parts of wireless system 200, and system 200 can include other circuit(s) and subsystem(s). Also, although the systems of wireless system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or transceiver 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, measurement collision resolution, and/or other user applications.

Alternatively or in addition to the operating system, system 200 can include communication infrastructure 240. Communication infrastructure 240 provides communication between, for example, processor 210, transceiver 220, and memory 250. In some implementations, communication infrastructure 240 may be a bus. Processor 210 together with instructions stored in memory 250 perform operations enabling wireless system 200 of system 1000 to implement the COT sharing signaling as described herein. Additionally or alternatively, transceiver 220 performs operations enabling wireless system 200 of system 1000 to implement the COT sharing signaling as described herein.

Transceiver 220 transmits and receives communications signals that support the COT sharing signaling, according to some aspects, and may be coupled to antenna 260. Antenna 260 may include one or more antennas that may be the same or different types. Transceiver 220 allows system 200 to communicate with other devices that may be wired and/or wireless. Transceiver 220 can include processors, controllers, radios, sockets, plugs, buffers, and like circuits/devices used for connecting to and communication on networks. According to some examples, transceiver 220 includes one or more circuits to connect to and communicate on wired and/or wireless networks. Transceiver 220 can include a cellular subsystem, a WLAN subsystem, and/or a Bluetooth™ subsystem, each including its own radio transceiver and protocol(s) as will be understood by those skilled arts based on the discussion provided herein. In some implementations, transceiver 220 can include more or fewer systems for communicating with other devices.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem (not shown) can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to, networks based on standards described in IEEE 802.11 (such as, but not limited to, IEEE 802.11ac, IEEE 802.11ax, IEEE 802.11bc, IEEE 802.11bd, IEEE 802.11be, etc.).

According to some aspects, processor 210, alone or in combination with memory 250, and/or transceiver 220, carries out the COT sharing signaling. For example, system 200 is configured to determine unused COT, and generate and send COT sharing information to the network, as will be discussed in further detail below.

According to some aspects, processor 210, alone or in combination with transceiver 220 and/or memory 205 can transmit the COT sharing information. Processor 210, alone or in combination with transceiver 220 and/or memory 205, can receive the MCOT, determine an unused portion of the MCOT, and generate and send COT sharing information.

Figure 3:
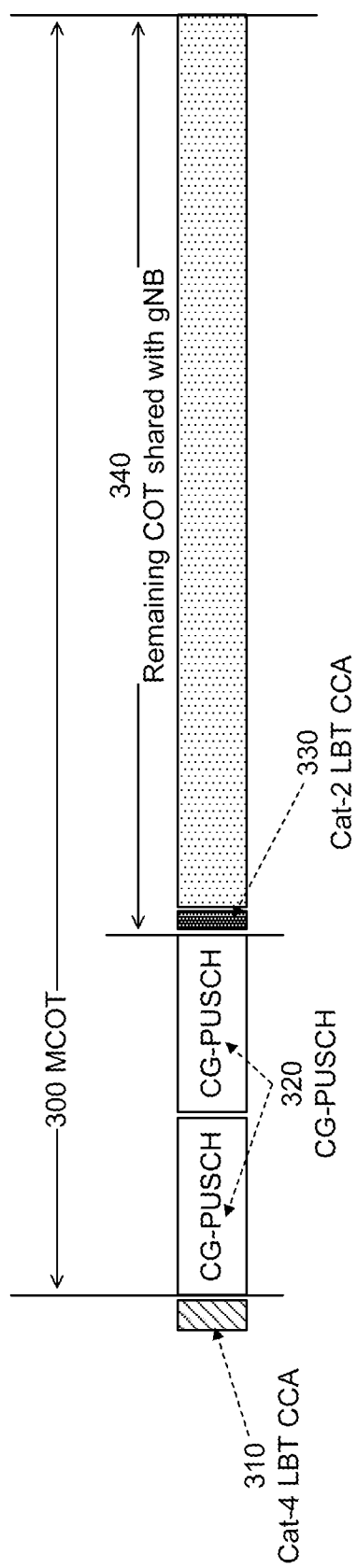
FIG. 3 illustrates a block diagram of an exemplary Maximum Channel Occupancy Time according to an aspect.

FIG. 3 illustrates a block diagram of an exemplary Maximum Channel Occupancy Time (MCOT) 300 that can be used for uplink transmission, according to an exemplary aspect. As shown in FIG. 3, the MCOT 300 is preceded by a Cat-4 LBT clear channel assessment (CCA) 310. Thereafter, the CG-PUSCH 320 is transmitted for a duration that is less than the MCOT 300. As a result, there is remaining duration 340 in the MCOT that can be shared with the gNB. The figures and explanations below describe aspects for signaling this shared remaining COT.

SCCI Signaling for COT Sharing Indication

Figure 4:
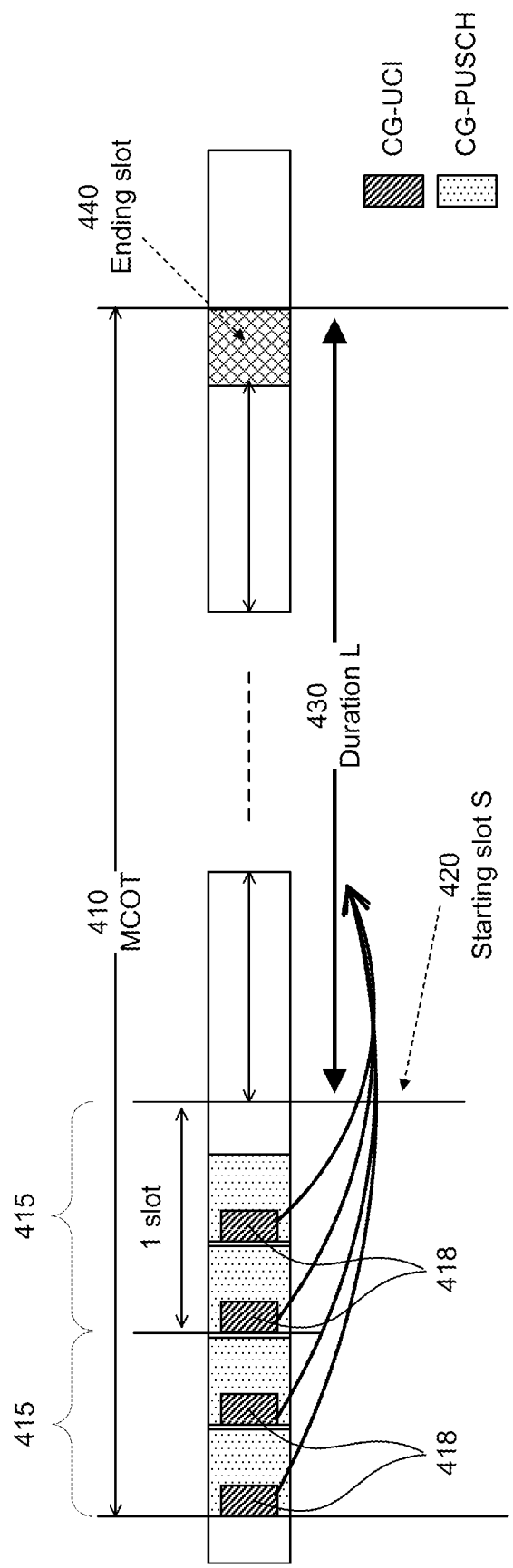
FIG. 4 illustrates a block diagram of an exemplary MCOT according to an aspect.

FIG. 4 illustrates a block diagram of an exemplary MCOT 410 according to an aspect. As shown in FIG. 4, a first portion of the MCOT 410 is used by the UE for uplink transmission over a plurality of slots, where the first portion is presented by slots 415. However, in the example of FIG. 4, the uplink concludes prior to the end of the MCOT 410, leaving a COT remainder duration 430 that is unused by the UE.

In the aspect of FIG. 4, a Shared-COT Configuration Index (SCCI) is included in the configured grant uplink control information (CG-UCI) payload to indicate a starting slot 420 and a number of consecutive slots (e.g., duration 430) available for COT sharing with the gNB. The starting slot 420 relates to the start of the slot where CG-UCI is transmitted. As shown in FIG. 4, each of the slots 415 include CG-UCI information 418 that carries the information necessary to signal the duration L 430 of the unused portion of the MCOT 410.

In an aspect, the value of the starting slot S and the number of consecutive slots L counting from slot S are determined from the SCCI value V included in the CG-UCI. For example, the values of L and S can be determined according to the following equation/algorithm, where N is the number of slots within the MCOT after a successful Cat-4 LBT:

If $(L-1) \leq \text{floor}\left(\frac{N}{2}\right)$, then $-V = N(L-1) + S$

Else, $-V = N(N - L + 1) + (N - 1 - S)$, where $L \geq 1$

Figure 5:
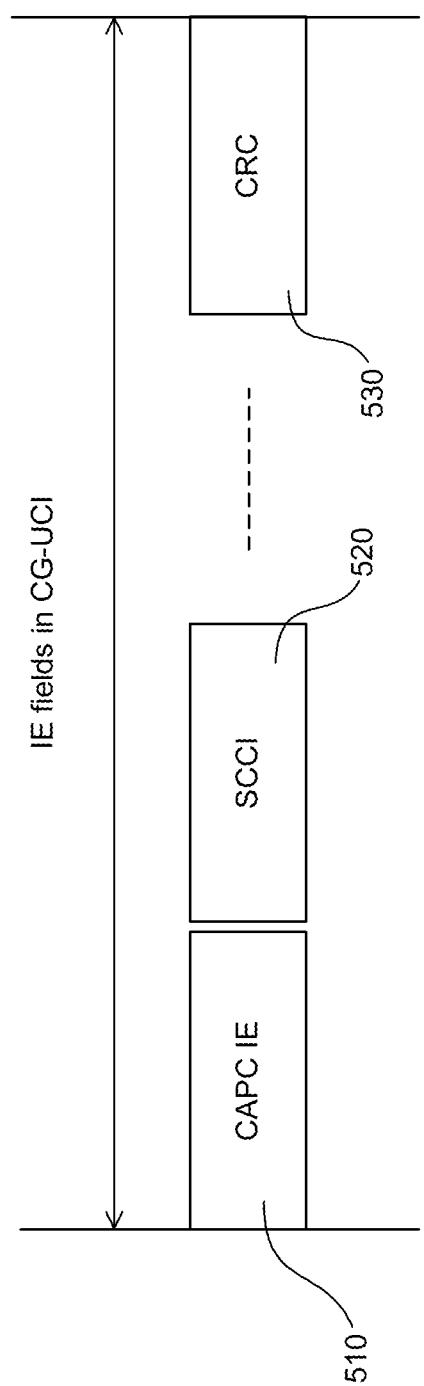
FIG. 5 illustrates a block diagram of an exemplary CG-UCI for use in COT sharing according to an aspect.

FIG. 5 illustrates a block diagram of an exemplary CG-UCI for use in COT sharing according to an aspect. FIG. 5 specifically illustrates the fields in the CG-UCI, which include a Channel Access Priority Class (CAPC) information field (IE) 510, the SCCI 520, and a cyclic redundancy check (CRC) 530. As discussed above, the value N represents the number of slots within the MCOT after a successful Cat-4 LBT. In an aspect, this is determined according to the Channel Access Priority Class (CAPC) that the UE used to perform Clean Channel Access (CCA) to obtain the channel. There is a dependency between the CAPC value and the value N. As a result, different approaches can be considered for the encoding of N, S and L within the SCCI field 420.

In an aspect, the CAPC value and SCCI are separately encoded in different DCI information field (IE), as depicted in FIG. 5. In this aspect, N is determined by the UE based on the CAPC IE value and then used to derive the SCCI values (N, S and L).

In another aspect, the CAPC value, S and L are jointly encoded using a single IE field in downlink control information (DCI) format. Table 1, below, provides an exemplary encoding scheme for jointly encoding these values. This table assumes that the MCOT is equal to two or three slots for different CAPC values and 15 KHz numerology uplink transmission.

| CAPC | N | S | L | SCCIV (V) |
|------|---|---|---|-----------|
| 1    | 2 | 1 | 1 | 000       |
| 2    | 3 | 1 | 2 | 001       |
|      |   | 2 | 1 | 010       |
| 3/4  | 6 | 1 | 5 | 011       |
|      |   | 2 | 4 | 100       |
|      |   | 3 | 3 | 101       |
|      |   | 4 | 2 | 110       |
|      |   | 5 | 1 | 111       |

In some instances where SCCIV control signaling uses a larger subcarrier spacing (SCS) numerology (e.g., 60 kHz, 6 ms MCOT corresponding to N=24 slots with 60 kHz SCS), large overhead (e.g., 9 bits in this example) to indicate different SCCI values may result. This is undesirable. Therefore, in an aspect, a reference SCS $u_{ref}$ may be signaled to indicate SCCI value. For example, in many instances, the gNB and the UE may employ different subcarrier spacing units (e.g., the reference spacing may be 15 kHz, whereas the UE uses 60 kHz). The $u_{ref}$ informs the UE of the unit by which the subcarrier spacing is interpreted by the gNB.

According to a first aspect, the reference $u_{ref}$ is provided by the gNB in system information blocks (SIBx) targeting all UEs. In another aspect, the $u_{ref}$ is transmitted by means of dedicated RRC signaling as part of COT sharing configuration for a particular UE. In still a further aspect, the $u_{ref}$ may be fixed in the 3GPP specification, such as according to frequency range (FR) (i.e., 15 kHz is used for FR1 and 60 kHz for FR2).

Figure 6:
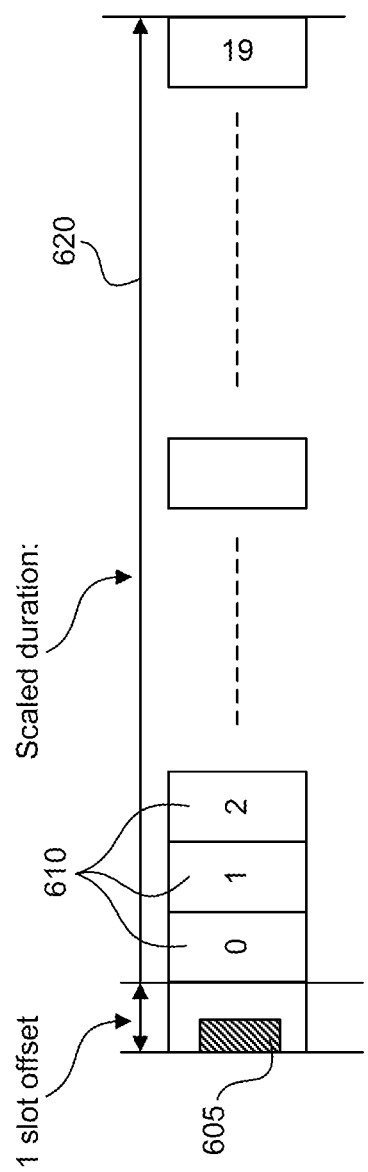
FIG. 6 illustrates a block diagram of an exemplary numerology dependent COT indication using a scaling factor according to an aspect.

FIG. 6 illustrates a block diagram of an exemplary numerology dependent COT indication using a scaling factor. In an aspect, the scaling factor describes the duration of the unused portion of the MCOT. In an aspect, a scaling factor is applied for both S and L. Alternatively, the scaling factor can be applied to L only when determining the UE-shared COT duration, where u is the numerology used for CG-UCI transmission. In an aspect, the scaling factor $K=2^{(u-u_{ref})}$. As shown in FIG. 6, a duration 620 of an unused portion of the MCOT includes a plurality of slots 610. The first slot includes an encoded SCCI value 605, which in the example of FIG. 6 is encoded as "011". As shown in Table 1, above, the SCCI value 011 corresponds to an L value of 5. Thus, by applying the equation for the scaling factor K and scaling it by the value of L (5), the total number of slots of the unused portion of the MCOT can be determined as:

$$5*K=5*2^{(2-0)}=20 \text{ slots}$$

In an aspect, CG-UCI may include information fields (IE) to indicate various parameters. Such parameters include, for example, the number of CG-PUSCHs configured by the gNB used for UE transmission in the present COT and a CAPC value that the UE used to access the channel for CG-PUSCH transmission. For example, the UE can derive the MCOT length based on the indicated CAPC value in CG-UCI.

Figure 7:
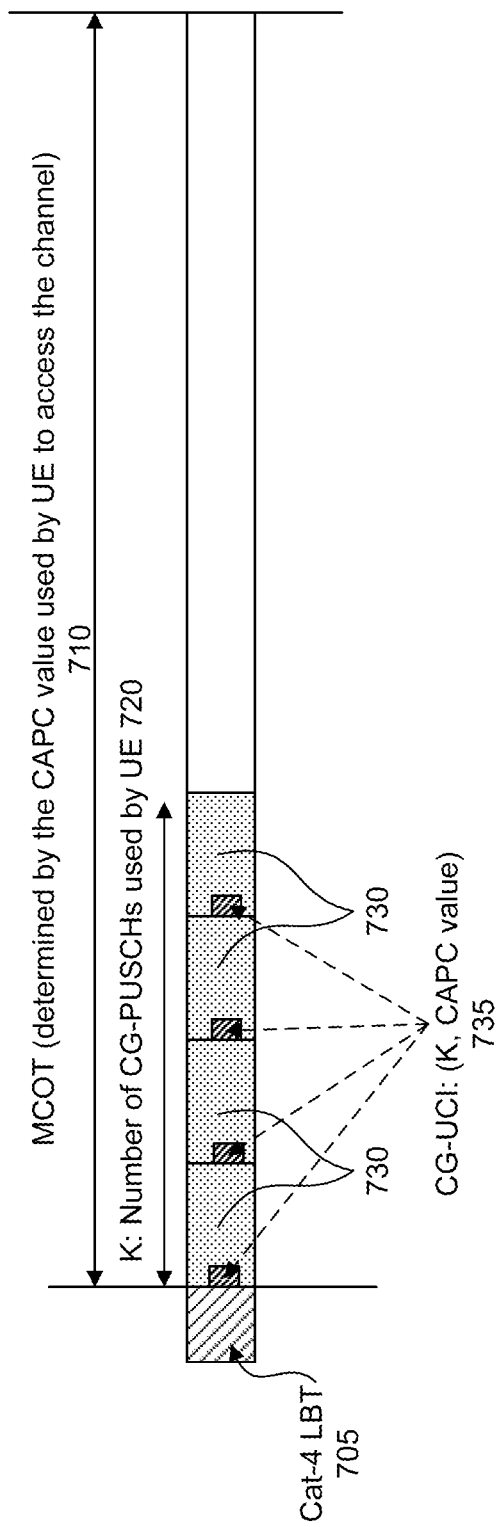
FIG. 7 illustrates a block diagram of an exemplary MCOT demonstrating the inclusion of IEs in the CG-UCI according to an aspect.

FIG. 7 illustrates a block diagram of an exemplary MCOT 710 demonstrating the inclusion of IEs in the CG-UCI according to an aspect. As shown in FIG. 7, the frame includes an MCOT 710 with a preceding Cat-4 LBT 705. Within the MCOT 710 is the number of CG-PUSCH slots 720 used by the UE. This includes a plurality of slots 730 that each have a CG-UCI portion 735. The CG-UCI portions 735 include a K and a CAPC value. The MCOT is determined by the CAPC value used by the UE to access the channel.

In another aspect, if the PUSCH scheduled by a DCI format overlaps with CG-PUSCH resource in the time domain, the UE may skip/omit the overlapped CG-PUSCH transmissions. This provides the necessary flexibility to the gNB to prioritize certain dynamic grant (DG) PUSCH scheduling for the UE (e.g., adjusting the MCS or other configurations).

In light of the above, another issue arises. Namely, there becomes a need for a method for indicating the partial slot to the gNB, which was partially used for CG-PUSCH transmission. A variety of solutions are provided in this disclosure.

Figure 8B:
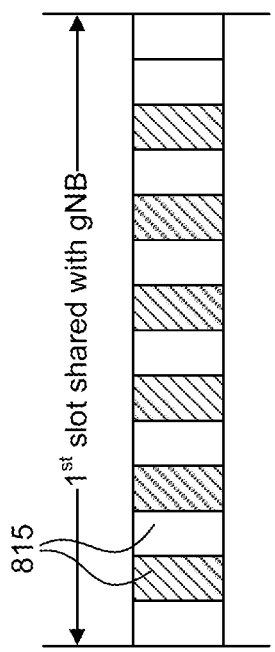
FIG. 8B illustrates an exemplary shared slot for use in gNB indication according to an aspect.
Figure 8A:
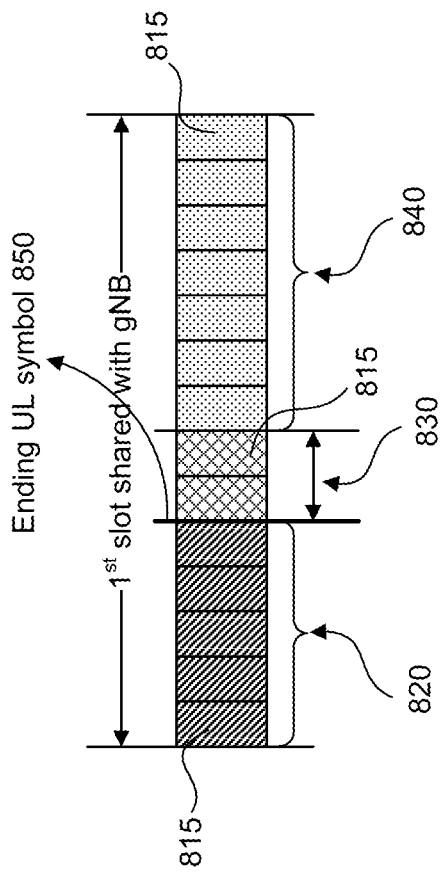
FIG. 8A illustrates an exemplary shared slot for use in gNB indication according to an aspect.

FIG. 8A illustrates an exemplary ending slot 810a for use in gNB shared slot indication according to an aspect. It may occur that the usage of the MCOT ends partway through a slot of the MCOT. In order to improve efficiency and maximize COT sharing, the signal of the gNB can include a partial slot indication to allow COT sharing of the unused portion of the end slot. The slot 810a includes a plurality of symbols 815. A first portion 820 of the signal 810a includes a first group of symbols used for CG-PUSCH transmission. A second portion 830 includes a second group of symbols corresponding to a UL-to-DL switching gap. Finally, a third portion 840 of the signal 810a includes a third group of symbols used for DL transmission. In this aspect, an ending symbol 850 is separately encoded in dedicated IE in the CG-UCI. As a consequence of this, the bits number of this IE can be determined as:

$$\log_2[N_{symb}^{slot}-1]=4 \text{ bits}.$$

In another aspect, a number of ending symbol candidates can be fixed/predefined in specification or signaled in SIB information or through dedicated RRC signaling on a per UE basis. This even further reduces signaling overhead.

To provide an example, the ending symbol 850 within a slot may be limited to an odd symbol, e.g., 1, 3, 5, 7, 9, or 11, as shown in FIG. 8B. FIG. 8B illustrates an exemplary end slot 810b for use in gNB partial slot indication according to an aspect. Like the shared slot 810a, the shared slot 810b includes a plurality of symbols 815. As shown in FIG. 8B, in order to reduce the signaling overhead, the UE can require that only the odd symbols 815 be used as the ending slot. Consequently, the bit width required for signaling the ending UL symbol 850 is reduced to 3 bits, thereby reducing overhead. In order to even further reduce, the selection of the end symbol can be even further limited to half-slot boundaries (e.g., the slot end, or slot midpoint). Compared to the previous aspect, where end symbols were limited to odd symbols, limiting the ending symbol to the half-slot boundary only requires 1 bit for signaling to the gNB. In another example, a number of ending symbol patterns and corresponding ending symbol locations within the pattern are separately indicated from the UE to the gNB. Notably, these approaches can be reused for the last slot indication within the shared COT.

In an aspect, SCCI IE is only transmitted in the first CG-PUSCH transmission. This is particularly likely given that the information within the SCCI IE is valid for the entire CG-PUSCH transmission within a UE-initiated COT. By transmitting the SCCI IE only in the first CG-PUSCH transmission, the gNB is given larger processing time to prepare the downlink transmission using the shared COT on PUCCH or PUSCH resource.

In an aspect, the UE may be provided different patterns by RRC signaling. In this aspect, each pattern has a particular configuration to signal to the UE. For example, in aspects, each pattern includes: 1) a number of symbols S1 from the last symbol in the starting slot (e.g., partial slot); 2) a number of symbols S2 from the first symbol in the ending slot; and 3) a reference SCS configuration. In some aspects, certain restrictions may be required for S1 and S2 indication in order to minimize the signaling overhead. For example, S1 and S2 could be restricted via relationship such that the sum of S1 and S2 is less than a particular maximum value. To provide an example, S1 and S2 may be restricted such that S1+S2=14 (i.e., integral number of slots shared to gNB). In this scenario, the gNB may provide the UE with the values of both S1 and S2, which will cause the UE to use those values. Alternatively, the gNB can provide only one of S1 or S2, in which case the UE will apply the above relationship to determine the unprovided value.

Table 2, below, illustrates exemplary patterns that may be provided to the UE and the corresponding values of S1 and S2 that result of these patterns. As shown below, pattern 1 follows the relationship between S1 and S2 described above, and therefore may be signaled by providing only one of S1 or S2. However, patterns 2 and 3 do not match the relationship, and therefore the values of both S1 and S2 must be provided.

| Pattern Index | S1 | S2 |
| --- | --- | --- |
| 1 | 7 | 7 |
| 2 | 4 | 7 |
| 3 | 10 | 7 |
| ... | ... | ... |

Figure 9:
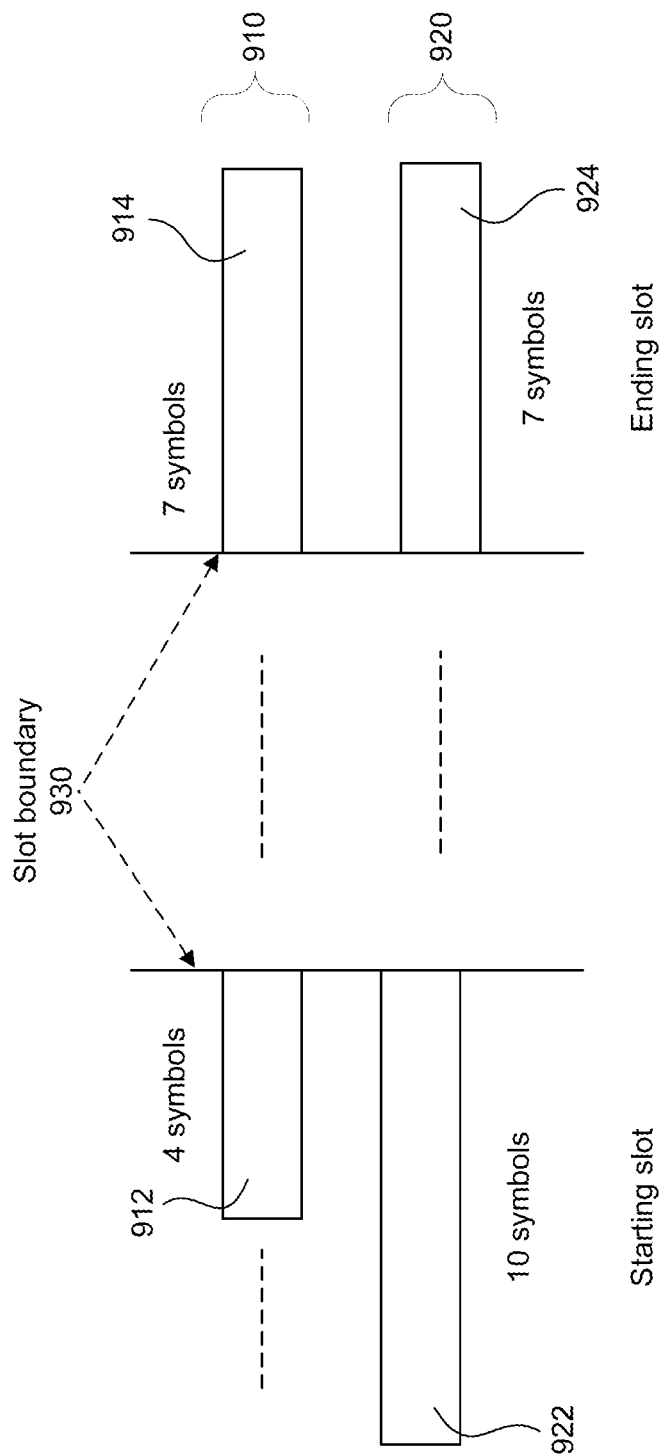
FIG. 9 illustrates exemplary COT length determinations that may be used by the gNB in the ending symbol indication.

FIG. 9 illustrates exemplary COT length determinations that may be used by the gNB in the ending symbol indication as described above with respect to Table 2. As shown in FIG. 9, a first solution 910 corresponds to pattern index 2 of Table 2. As shown, the first solution 910 includes a starting slot 912 having four symbols corresponding to S1 of pattern 2, and an ending slot 914 that includes 7 symbols corresponding to S2. Likewise, a second solution 920 corresponds to pattern index 3 of Table 2. The second solution 920 includes a starting slot 922 that includes 10 symbols corresponding to S1 of pattern index 3, and an ending slot 924 that includes 7 symbols corresponding to S2 of pattern index 3.

In aspects where the UE initiates COT sharing with the gNB, it is possible that more than one COT is shared to the gNB by different UEs. In order to properly utilize these multiple COTs, the gNB must be configured accordingly. A variety of solutions are disclosed herein to determine the duration of DL transmissions from the gNB.

Figure 10:
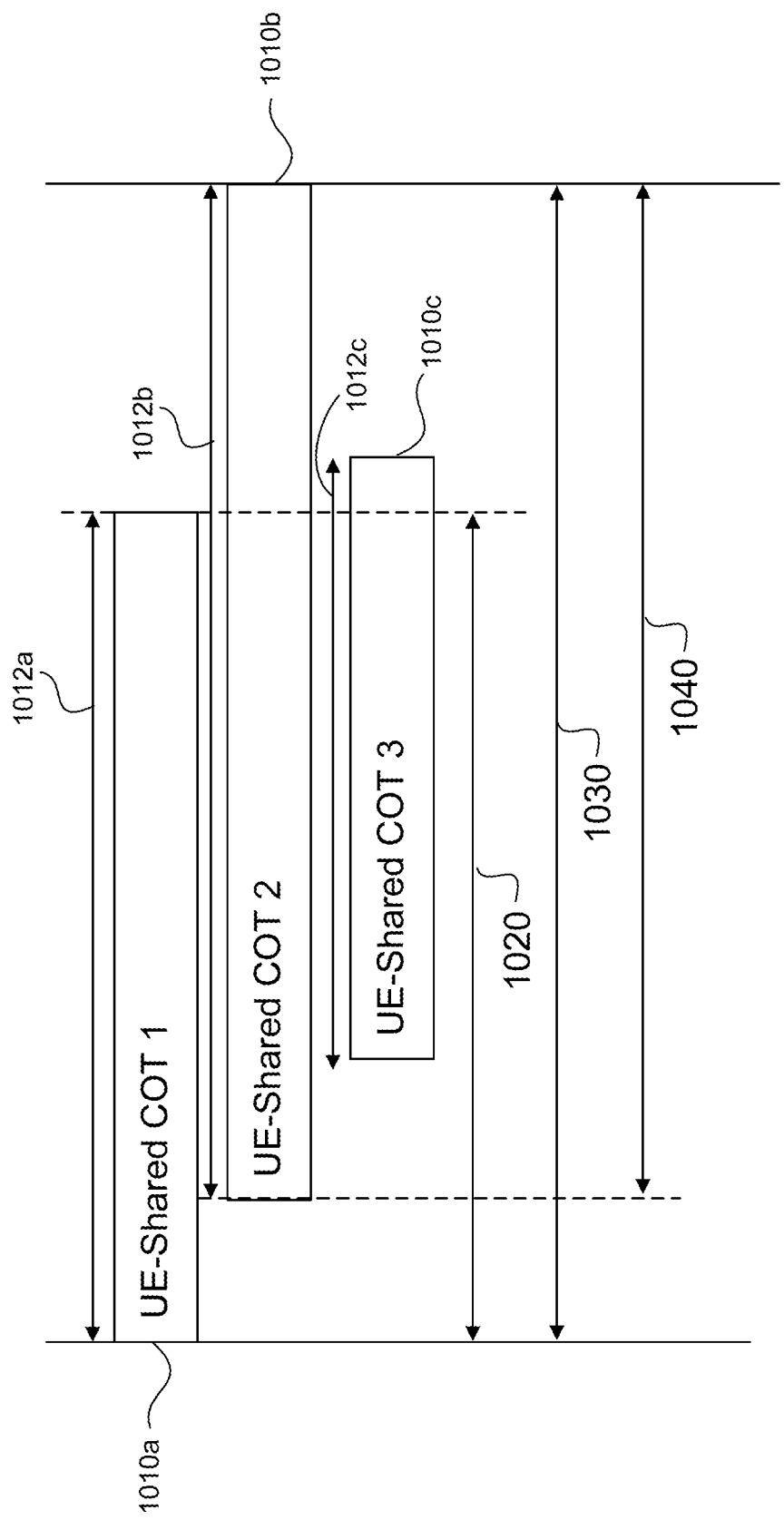
FIG. 10 illustrates a plurality of COTs overlapping in time according to aspects of the present disclosure, along with corresponding solutions.

FIG. 10 illustrates a plurality of COTs overlapping in time according to aspects of the present disclosure, along with corresponding solutions. FIG. 10 shows a plurality of COTs 1010 received from various UEs, including UE-Shared COT 1 1010a, UE-Shared COT 2 1010b, and UE-Shared COT 3 1010c. Each of the shared COTs have corresponding durations 1012a, 1012b, and 1012c, respectively. In a first aspect corresponding to a first solution, the shared solution duration 1020 is determined to be the time interval before the first starting symbol to the first ending symbol across UE-initiated COTs.

In another aspect, the duration 1030 is determined according to a second solution as the union of the UE-initiated COTs (e.g., the total duration of the various COTs). This aspect results in a duration 1030 that spans from the beginning of the earliest COT 1010a to the end of the latest COT 1010b. In another aspect, the duration is equal to the duration of the shortest or the longest COT. As shown in FIG. 10, when the shortest COT is used, the duration 1012c (e.g., the duration of COT 3) is used. On the other hand, when configured to use the longest COT duration, the duration 1012b (e.g., the duration of COT 2) is used.

Figure 11:
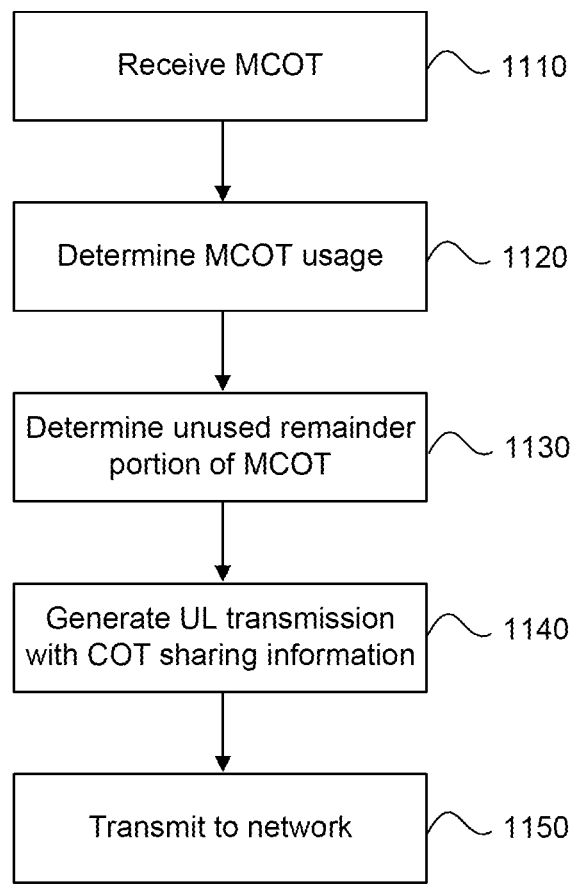
FIG. 11 illustrates a flowchart diagram of an exemplary method for signaling COT sharing to a base station by a UE according to an aspect.

FIG. 11 illustrates a flowchart diagram of an exemplary method 1100 for signaling COT sharing to a base station by a UE according to an aspect. As shown in FIG. 11, the UE receives an MCOT from the network (1110). The UE determines a first portion of the MCOT that it will use for uplink transmission (1120). The UE also determines an unused remainder portion of the MCOT that will go unused (1130).

Based on this information, the UE generates an uplink transmission (1140) with COT sharing information. Specifically, the uplink transmission is generated to include information sufficient to identify the unused portion of the MCOT, such as a starting slot and a number of consecutive slots of the unused portion. Once generated, the uplink transmission with the COT sharing information is transmitted (1150) to the network.

Figure 12:
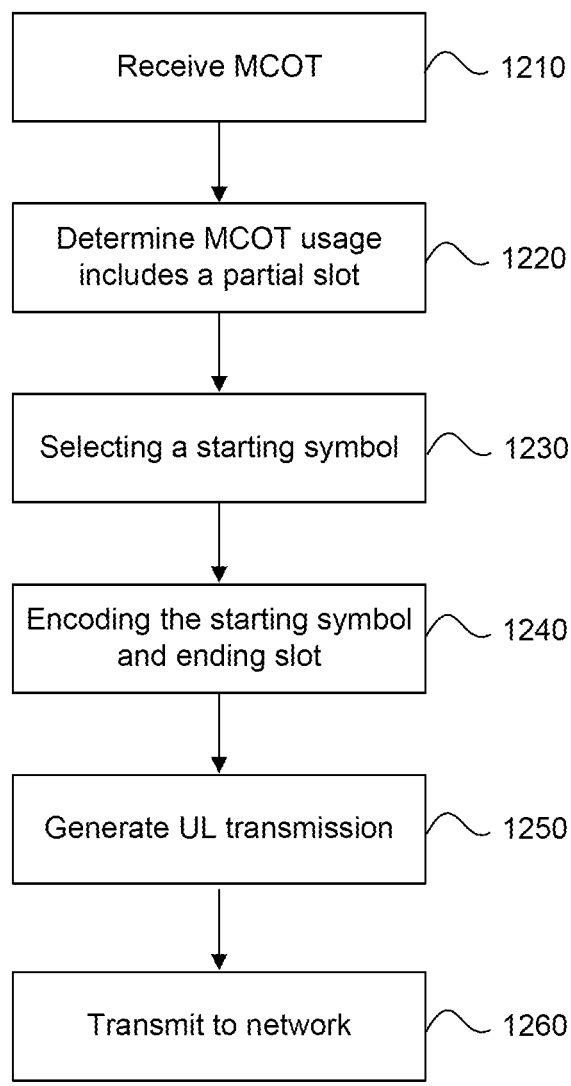
FIG. 12 illustrates a flowchart diagram of an exemplary method 1100 for signaling COT sharing to a base station by a UE according to an aspect.

FIG. 12 illustrates a flowchart diagram of an exemplary method 1200 for signaling COT sharing to a base station by a UE according to an aspect. As shown in FIG. 12, the UE receives an MCOT from the network (1210). The UE determines a first portion of the MCOT that it will use for uplink transmission, and a second unused portion of the MCOT that will go unused. The UE determines that the unused portion includes a partial slot of the uplink transmission (1220).

Once it is determined that the unused portion includes a partial slot of the uplink transmission, the UE then selects a starting symbol for the unused portion (1230). As described above, this may include a variety of different solutions, such as selecting the next available symbol (e.g., such as shown in FIG. 8A, selecting a next even symbol (such as shown in FIG. 8B), or selecting a symbol corresponding to a next half-slot. Once the starting slot is selected (1230), the starting symbol and ending slot information is encoded (1240). The UE then generates the uplink transmission (1250) so as to include the starting symbol and ending slot information, in CG-UCI for example. Once generated, the uplink transmission with the COT sharing information is transmitted (1260) to the network.

Although the method has been described according to one implementation, it should be understood that many of the steps may be carried out in different order or omitted according to the specific circumstances of the application.

Figure 13:
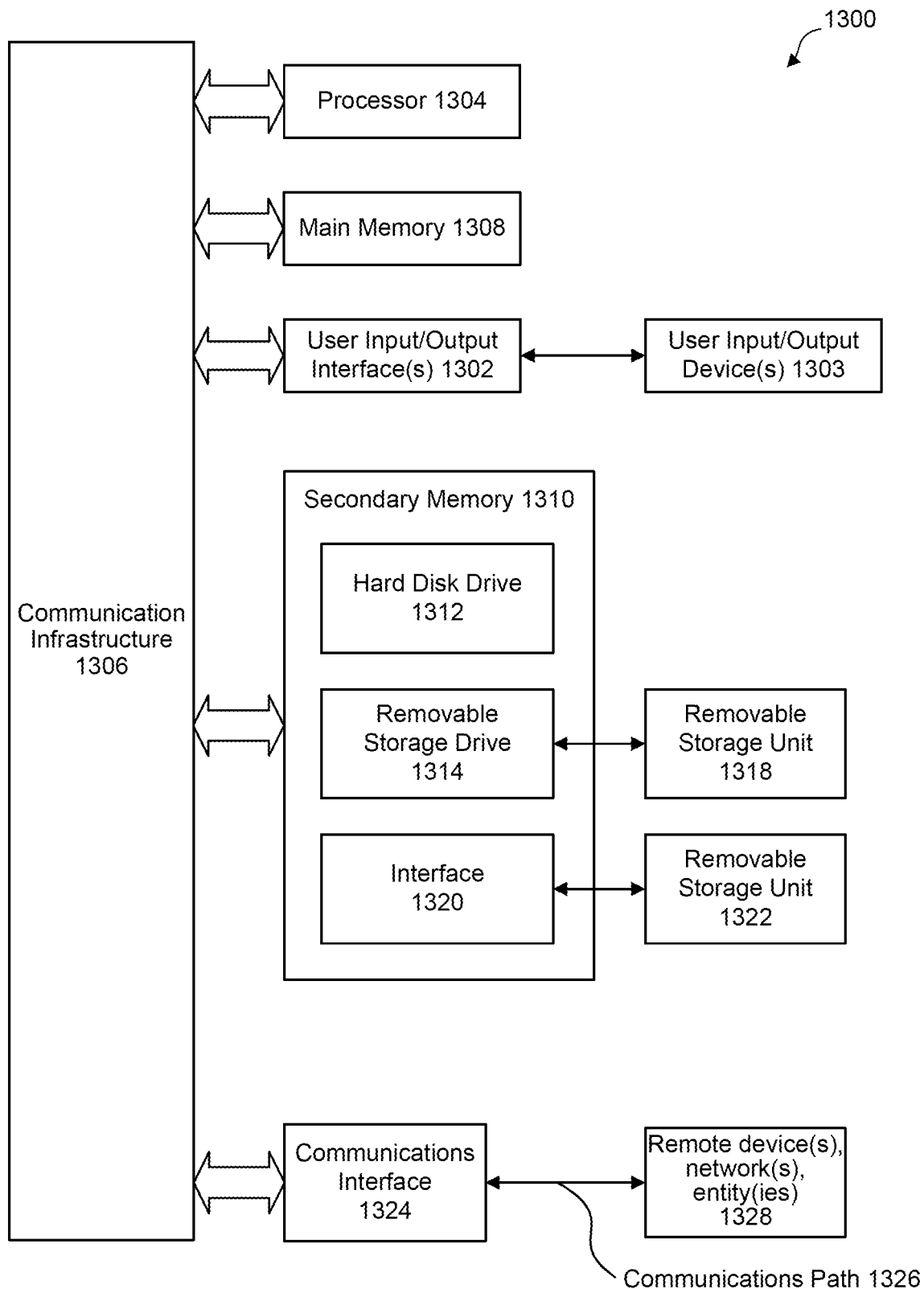
FIG. 13 illustrates a block representation of an exemplary generic computer system capable of implementing certain aspects of the present disclosure.

Various aspects can be implemented, for example, using one or more computer systems, such as computer system 1300 shown in FIG. 13. Computer system 1300 can be any well-known computer capable of performing the functions described herein such as devices 1310, 1320 of FIG. 13, or 200 of FIG. 2. Computer system 1300 includes one or more processors (also called central processing units, or CPUs), such as a processor 1304. Processor 1304 is connected to a communication infrastructure 1306 (e.g., a bus.) Computer system 1300 also includes user input/output device(s) 1303, such as monitors, keyboards, pointing devices, etc., that communicate with communication infrastructure 1306 through user input/output interface(s) 1302. Computer system 1300 also includes a main or primary memory 1308, such as random access memory (RAM). Main memory 1308 may include one or more levels of cache. Main memory 1308 has stored therein control logic (e.g., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 reads from and/or writes to removable storage unit 1318 in a well-known manner.

According to some aspects, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1300, main memory 1308, secondary memory 1310 and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 13. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary aspects of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the disclosure that others can, by applying knowledge within the skill of the art, readily modify and/or adapt for various applications such specific aspects, without undue experimentation, without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary aspects, but should be defined only in accordance with the following claims and their equivalents.

What is claimed is:

1. A user equipment, comprising:
 a transceiver configured to wirelessly transmit and receive information with a communications network; and
 one or more processors configured to:
  receive a maximum channel occupancy time (MCOT) from the communications network;
  determine a first portion of the MCOT that will be used for uplink transmission and a remainder portion of the MCOT that will be unused;
  generate an uplink transmission for transmitting during the first portion of the MCOT that includes channel occupancy time (COT) sharing information, the COT sharing information describing at least one of a location or a duration of the remainder portion, and being included within a configured grant uplink control information (CG-UCI) of the uplink transmission; and
  cause the transceiver to transmit the uplink transmission to the communications network,
 wherein the location of the remainder portion indicates a starting slot of the remainder portion relative to a slot in which the CG-UCI is transmitted.

2. The user equipment of claim 1, wherein the COT sharing information describes the starting slot and a number of consecutive slots of the remainder portion.

3. The user equipment of claim 2, wherein the COT sharing information includes an index value from which the starting slot and the number of consecutive slots can be determined.

4. The user equipment of claim 3, wherein the one or more processors is further configured to determine the number of consecutive slots based on a Channel Access Priority Class (CAPC) used by the user equipment to obtain a channel.

5. The user equipment of claim 4, wherein the one or more processors are further configured to derive the index value from the number of consecutive slots.

6. The user equipment of claim 1, wherein the one or more processors are further configured to:
 receive a subcarrier spacing reference from the communications network; and
 generate a scaling factor based on the received subcarrier spacing reference.

7. The user equipment of claim 1, wherein the duration indicates a number of consecutive slots available for COT sharing.

8. An apparatus, comprising:
 a memory; and
 one or more processors, coupled to the memory, configured to:
  receive a maximum channel occupancy time (MCOT) from a communications network;
  determine a first portion of the MCOT that will be used for uplink transmission, the first portion including a plurality of slots that includes an ending slot that is only partially used, and a remainder portion of the MCOT that will be unused, the remainder portion including an unused portion of the ending slot;
  generate an uplink transmission for transmitting during the first portion of the MCOT that includes channel occupancy time (COT) sharing information, the COT sharing information describing a starting point of the remainder portion based on the unused portion of the ending slot, and being included within a configured grant uplink control information (CG-UCI) of the uplink transmission; and
  transmit the uplink transmission to the communications network,
 wherein the starting point of the remainder portion indicates a starting slot of the remainder portion relative to a slot in which the CG-UCI is transmitted.

9. The apparatus of claim 8, wherein the generating the uplink transmission includes a symbol indicator that describes a starting point of the MCOT within the ending slot.

10. The apparatus of claim 9, wherein the symbol indicator identifies an ending symbol within the ending slot of the first portion of the MCOT.

11. The apparatus of claim 10, wherein the symbol indicator is separately encoded in a dedicated information field of the CG-UCI.

12. The apparatus of claim 8, wherein the one or more processors are further configured to set the starting point of the remainder portion to an even symbol of the unused portion of the ending slot.

13. The apparatus of claim 8, wherein the one or more processors are further configured to set the starting point of the remainder portion to a nearest half-slot boundary after the first portion.

14. A method for signaling an unused portion of a maximum channel occupancy time (MCOT) by a user equipment, the method comprising:
    receiving the MCOT from a communications network;
    determining a first portion of the MCOT that will be used for uplink transmission and a remainder portion of the MCOT that will be unused;
    generating an uplink transmission for transmitting during the first portion of the MCOT that includes channel occupancy time (COT) sharing information, wherein the COT sharing information is included within a configured grant uplink control information (CG-UCI) of the uplink transmission; and
    transmitting the uplink transmission to the communications network,
    wherein the COT sharing information describes at least one of a location or a duration of the remainder portion, the location of the remainder portion indicating a starting slot of the remainder portion relative to a slot in which the CG-UCI is transmitted.

15. The method of claim 14, further comprising encoding the COT sharing information in configured grant uplink control information (CG-UCI) of the uplink transmission.

16. The method of claim 14, wherein the COT sharing information describes the starting slot and a number of consecutive slots of the remainder portion.

17. The method of claim 16, wherein the COT sharing information includes an index value from which the starting slot and the number of consecutive slots can be determined.

18. The method of claim 17, further comprising determining the number of consecutive slots based on a Channel Access Priority Class (CAPC) used by the user equipment to obtain a channel.

19. The method of claim 18, further comprising deriving the index value from the number of consecutive slots.

20. The method of claim 14, further comprising:
    receiving a subcarrier spacing reference from the communications network; and
    generating a scaling factor based on the received subcarrier spacing reference.

* * * * *